(12) United States Patent
Ehinger et al.

(10) Patent No.: US 10,946,954 B2
(45) Date of Patent: Mar. 16, 2021

(54) VARIABLE-SPEED DRIVE SYSTEM FOR TILTROTOR WITH FIXED ENGINE AND ROTATING PROPROTOR

(71) Applicant: Bell Helicopter Textron Inc., Fort Worth, TX (US)

(72) Inventors: Ryan Ehinger, Southlake, TX (US); David Bockmiller, Fort Worth, TX (US); Eric Sinusas, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 904 days.

(21) Appl. No.: 15/649,217

(22) Filed: Jul. 13, 2017

(65) Prior Publication Data
US 2019/0016451 A1    Jan. 17, 2019

(51) Int. Cl.
*B64C 29/00*   (2006.01)
*B64C 27/14*   (2006.01)
(Continued)

(52) U.S. Cl.
CPC .............. *B64C 27/14* (2013.01); *B64C 27/12* (2013.01); *B64C 27/28* (2013.01); *B64C 27/52* (2013.01); *B64C 29/0033* (2013.01); *B64D 35/00* (2013.01); *F02C 7/36* (2013.01); *F16H 3/08* (2013.01); *F16H 59/44* (2013.01);
(Continued)

(58) Field of Classification Search
CPC .... B64C 29/0033; B64D 35/00; B64D 35/04; B64D 35/06; B64D 35/08
See application file for complete search history.

(56) References Cited

U.S. PATENT DOCUMENTS 2,814,451 A  * 11/1957 Turner ................ B64C 29/0033
                                                    244/7 R
3,416,309 A  * 12/1968 Elmes ................... F02N 15/006
                                                    60/39.15
(Continued)

FOREIGN PATENT DOCUMENTS

EP          1106870 A2    10/2003
EP          2930398 A1    10/2015
GB          665629 A       1/1952

*Primary Examiner* — Richard R. Green
*Assistant Examiner* — Michael A. Fabula
(74) *Attorney, Agent, or Firm* — Shackelford, Bowen, McKinley & Norton, LLP

(57) ABSTRACT

A variable-speed gearbox for a tiltrotor with fixed engine and rotating proprotor includes an input shaft coupled to the respective fixed engine, an output shaft coupled to the respective proprotor; a high-speed clutch integrated into a high-speed gear train, the high-speed gear train having an input coupled to the input shaft and an output coupled to the output shaft; and a low-speed clutch integrated into a low-speed gear train, the low-speed gear train having an input coupled to the input shaft and an output coupled to the output shaft. The high-speed clutch and the low-speed clutch can be freewheeling clutches capable of disconnecting the output and the input of the respective gear train of the high and low-speed gear trains in an overrunning condition when the output rotates faster than the input of the respective gear train. The low-speed clutch can be permanently engaged. In accordance to some embodiments the variable-speed gearboxes may include an accessory drive.

13 Claims, 10 Drawing Sheets

(51) Int. Cl.
*B64D 35/00* (2006.01)
*B64C 27/12* (2006.01)
*F02C 7/36* (2006.01)
*B64C 27/28* (2006.01)
*B64C 27/52* (2006.01)
*F16H 3/08* (2006.01)
*F16H 59/44* (2006.01)
*F16H 3/24* (2006.01)

(52) U.S. Cl.
CPC .......... *F16H 3/24* (2013.01); *F16H 2200/003* (2013.01); *F16H 2200/0034* (2013.01)

(56) References Cited

U.S. PATENT DOCUMENTS

| | | | | |
|---|---|---|---|---|
| 3,439,888 | A * | 4/1969 | Dancik | B64C 29/0033 244/56 |
| 3,514,052 | A * | 5/1970 | McKeown | B64C 29/0033 244/12.3 |
| 3,515,500 | A * | 6/1970 | Nachod | B64C 29/0033 416/142 |
| 4,542,722 | A * | 9/1985 | Reynolds | F02B 67/04 123/179.19 |
| 4,829,850 | A * | 5/1989 | Soloy | B64D 7/00 248/554 |
| 7,866,598 | B2 * | 1/2011 | Waide | B64D 35/00 244/7 R |
| 8,133,155 | B2 | 3/2012 | Ehinger et al. | |
| 9,126,678 | B2 * | 9/2015 | Ross | B64C 29/0075 |
| 9,174,731 | B2 | 11/2015 | Ross et al. | |
| 9,663,225 | B1 * | 5/2017 | Kooiman | B64C 29/0033 |
| 9,783,292 | B2 * | 10/2017 | Kooiman | B64C 29/0033 |
| 9,964,184 | B2 * | 5/2018 | Modrzejewski | F16H 3/58 |
| 10,466,009 | B1 * | 11/2019 | Shundo | F41A 27/28 |
| 2007/0205321 | A1 | 9/2007 | Waide | |
| 2008/0173752 | A1 | 7/2008 | Palcic et al. | |
| 2009/0224096 | A1 * | 9/2009 | Waide | B64D 31/12 244/60 |
| 2009/0266941 | A1 * | 10/2009 | Karem | B64C 3/185 244/7 A |
| 2011/0015034 | A1 * | 1/2011 | Ehinger | B64C 27/12 477/70 |
| 2014/0263855 | A1 * | 9/2014 | Ross | B64C 29/0033 244/7 A |
| 2015/0239555 | A1 * | 8/2015 | Foskey | B64C 11/04 416/134 A |
| 2016/0076629 | A1 * | 3/2016 | Modrzejewski | B64D 35/00 244/17.11 |
| 2016/0122039 | A1 * | 5/2016 | Ehinger | B64D 35/00 416/170 R |
| 2017/0137122 | A1 * | 5/2017 | Kooiman | F16H 1/006 |
| 2017/0144746 | A1 * | 5/2017 | Schank | B64C 29/0033 |
| 2017/0158323 | A1 * | 6/2017 | Ross | B64D 27/12 |
| 2017/0217598 | A1 * | 8/2017 | Bacon | B64C 29/0033 |
| 2017/0305567 | A1 * | 10/2017 | Williams | F16C 17/26 |
| 2017/0305568 | A1 * | 10/2017 | King | B64C 27/28 |
| 2018/0057148 | A1 * | 3/2018 | Bosworth | B64C 13/18 |
| 2018/0057159 | A1 * | 3/2018 | Ivans | B64C 3/38 |
| 2018/0079501 | A1 * | 3/2018 | Foskey | B64C 5/02 |
| 2018/0079503 | A1 * | 3/2018 | Ivans | B64D 33/04 |
| 2018/0162526 | A1 * | 6/2018 | Parham, Jr. | B64C 27/54 |
| 2018/0354616 | A1 * | 12/2018 | Groninga | B64D 33/02 |
| 2019/0016441 | A1 * | 1/2019 | Schank | B64C 29/0033 |
| 2019/0016454 | A1 * | 1/2019 | Cravener | F16C 27/02 |
| 2019/0016455 | A1 * | 1/2019 | Kizhakkepat | F16C 17/10 |
| 2019/0016456 | A1 * | 1/2019 | Dearman | B64C 27/41 |
| 2019/0092485 | A1 * | 3/2019 | Decker | B64C 29/0033 |

* cited by examiner

VARIABLE-SPEED DRIVE SYSTEM FOR TILTROTOR WITH FIXED ENGINE AND ROTATING PROPROTOR

BACKGROUND

This section provides background information to facilitate a better understanding of the various aspects of the disclosure. It should be understood that the statements in this section of this document are to be read in this light, and not as admissions of prior art.

Powered lift rotorcrafts such as helicopters and tiltrotors use lifting forces generated by wings or rotor blades that revolve around a mast. In a conventional rotorcraft, rotor blades are powered by one or more engines by way of a transmission, and the speed of the transmission input is reduced using one or more fixed-ratio reduction stages such that the speed of the output powering the rotor is lower than the input speed by a fixed ratio. Optimization of rotorcraft performance, including noise, range, and efficiency, can be accomplished by varying rotor speed.

A conventional tiltrotor aircraft configuration can include a fixed engine with a rotating proprotor; however, conventional packaging arrangements of the fixed engine and the rotating proprotor can have significant shortcomings. Further, the location of the fixed engine and the rotating proprotor in relation to each other, as well as to the wing structure, can have significant influence upon the size and weight of the supporting structure.

SUMMARY

An example of a variable-speed drive system for a tiltrotor includes a first propulsion system having a first fixed-drive system coupled to a first proprotor that is operable between a helicopter mode and an airplane mode, wherein the fixed-drive system includes a first fixed engine and a first variable-speed gearbox; a second propulsion system having a second fixed-drive system coupled to a second proprotor that is operable between a helicopter mode and an airplane mode, wherein the fixed-drive system includes a second fixed engine and a second variable-speed gearbox; and an interconnect shaft coupled between the first and second gearboxes providing a torque path that enables a single engine to provide torque to both the first and the second proprotor. The first and second variable-speed gearboxes may be configured to shift between a high gear ratio and a low gear ratio by modulating the speed of the coupled engine. The first and second variable-speed gearboxes may be configured to shift between a high gear ratio and a low gear ratio by modulating the speed of the first and second proprotors.

An example of a variable-speed gearbox for a tiltrotor with fixed engine and rotating proprotor includes an input shaft coupled to the respective fixed engine, an output shaft coupled to the respective proprotor; a high-speed clutch integrated into a high-speed gear train, the high-speed gear train having an input coupled to the input shaft and an output coupled to the output shaft; and a low-speed clutch integrated into a low-speed gear train, the low-speed gear train having an input coupled to the input shaft and an output coupled to the output shaft. The high-speed clutch and the low-speed clutch can be freewheeling clutches capable of disconnecting the output and the input of the respective gear train of the high and low-speed gear trains in an overrunning condition when the output rotates faster than the input of the respective gear train. The low-speed clutch can be permanently engaged. In accordance to some embodiments the variable-speed gearboxes may include an accessory drive.

In accordance to an embodiment a variable-speed drive system for a tiltrotor with fixed engine and rotating proprotor includes a first propulsion system having a first fixed-drive system coupled to a first proprotor that is operable between a helicopter mode and an airplane mode, wherein the fixed-drive system includes a first fixed engine and a first variable-speed gearbox; a second propulsion system having a second fixed-drive system coupled to a second proprotor that is operable between a helicopter mode and an airplane mode, wherein the fixed-drive system includes a second fixed engine and a second variable-speed gearbox; and an interconnect shaft coupled between the first and second gearboxes providing a torque path that enables a single engine to provide torque to both the first and the second proprotor. The variable-speed gearboxes each include an input shaft coupled to the respective fixed engine, an output shaft coupled to the respective proprotor; a high-speed clutch integrated into a high-speed gear train, the high-speed gear train having an input coupled to the input shaft and an output coupled to the output shaft; a low-speed clutch integrated into a low-speed gear train, the low-speed gear train having an input coupled to the input shaft and an output coupled to the output shaft; and an accessory drive having an input connected to one or both of the input shaft and the output shaft.

A method of operating a tiltrotor with a fixed engine and rotating proprotor includes shifting a first and a second variable-speed gearbox between a high gear ratio and a low gear ratio by one of modulating the speed of coupled first and second engines and modulating speed of first and second proprotors. The tiltrotor including a first propulsion system having a first fixed-drive system coupled to the first proprotor that is operable between a helicopter mode and an airplane mode, wherein the fixed-drive system comprises the first fixed engine and the first variable-speed gearbox; a second propulsion system comprising a second fixed-drive system coupled to the second proprotor that is operable between a helicopter mode and an airplane mode, wherein the fixed-drive system comprises the second fixed engine and the second variable-speed gearbox; an interconnect shaft coupled between the first and second gearboxes providing a torque path that enables a single engine to provide torque to both the first and the second proprotor; wherein the first and the second variable-speed gearbox each comprises an input shaft coupled to the respective fixed engine; an output shaft coupled to the respective proprotor; a high-speed clutch integrated into a high-speed gear train, the high-speed gear train having an input coupled to the input shaft and an output coupled to the output shaft; and a low-speed clutch integrated into a low-speed gear train, the low-speed gear train having an input coupled to the input shaft and an output coupled to the output shaft, wherein the high-speed clutch and the low-speed clutch are freewheeling clutches and are capable of disconnecting the output and the input of the respective gear train of the high and low-speed gear trains in an overrunning condition when the output rotates faster than the input of the respective gear train.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 3 is a cut-away view of an apparatus according to one or more aspects of the disclosure.

DETAILED DESCRIPTION

Figure 1:
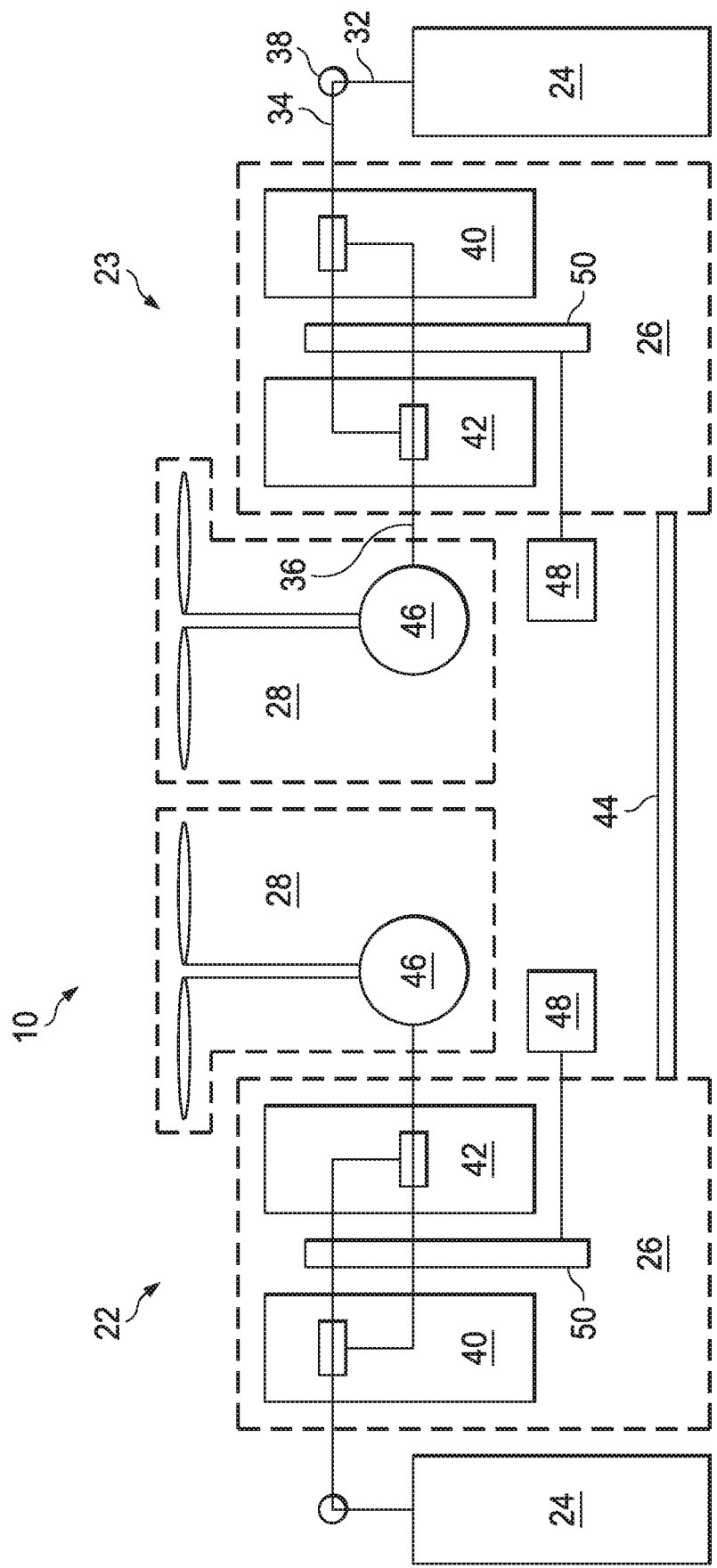
FIG. 1 is a schematic view of a fixed engine variable-speed tiltrotor drive system according to one or more aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
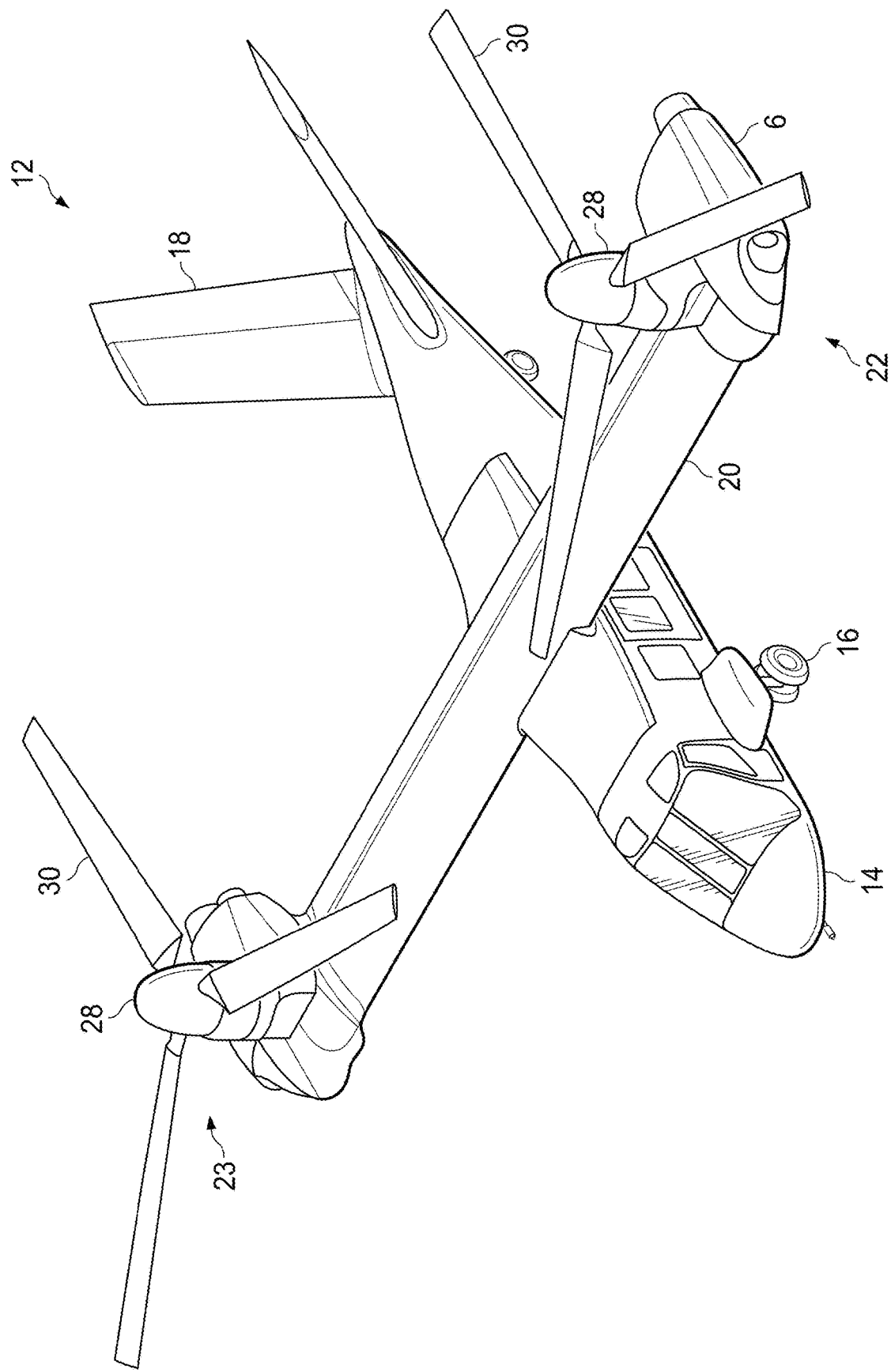
FIGS. 2 and 3 illustrate examples of tiltrotor aircrafts that can implement fixed engine variable-speed tiltrotor drive systems according to aspects of the disclosure.
Figure 3:
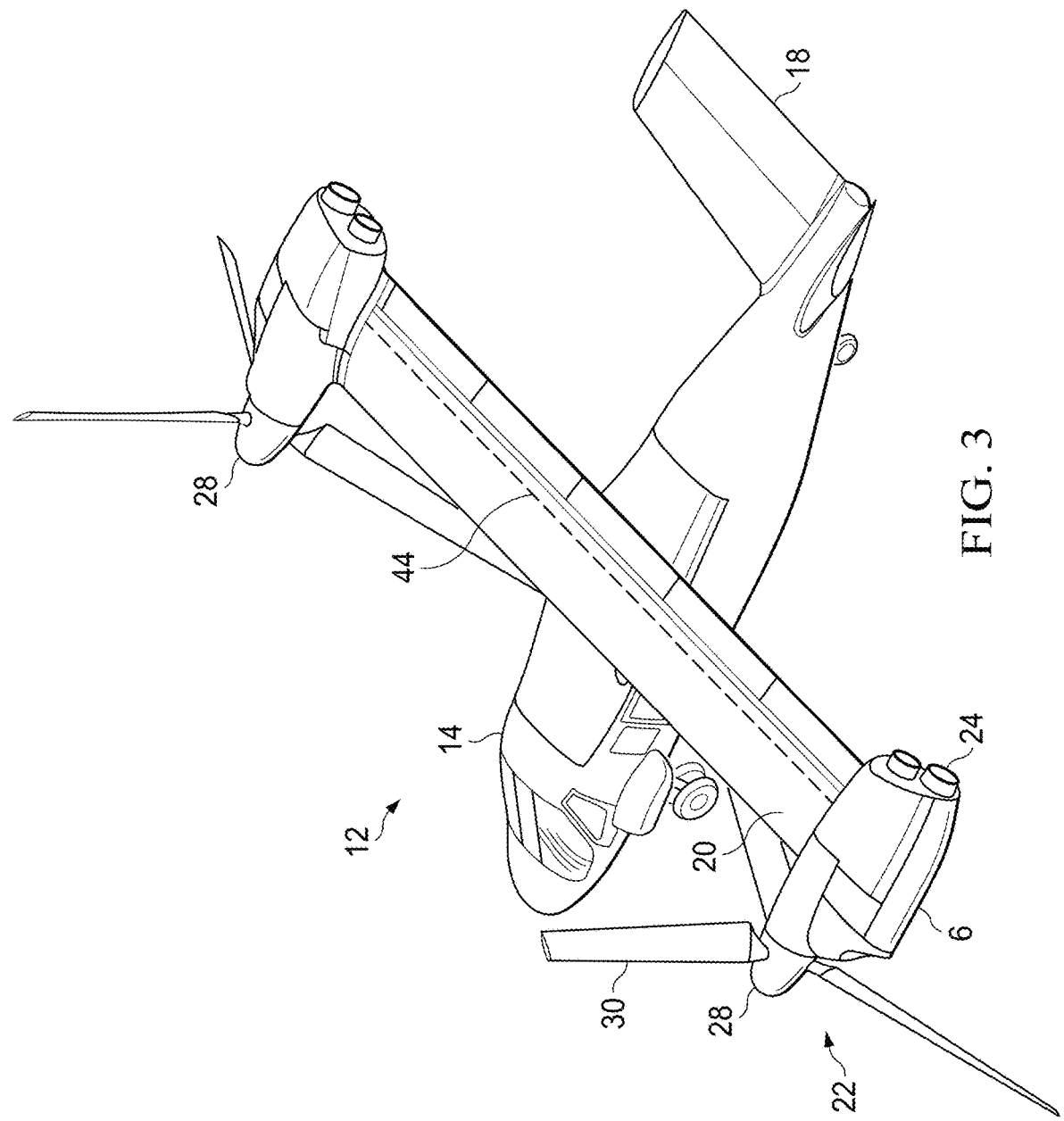
Figure 4:
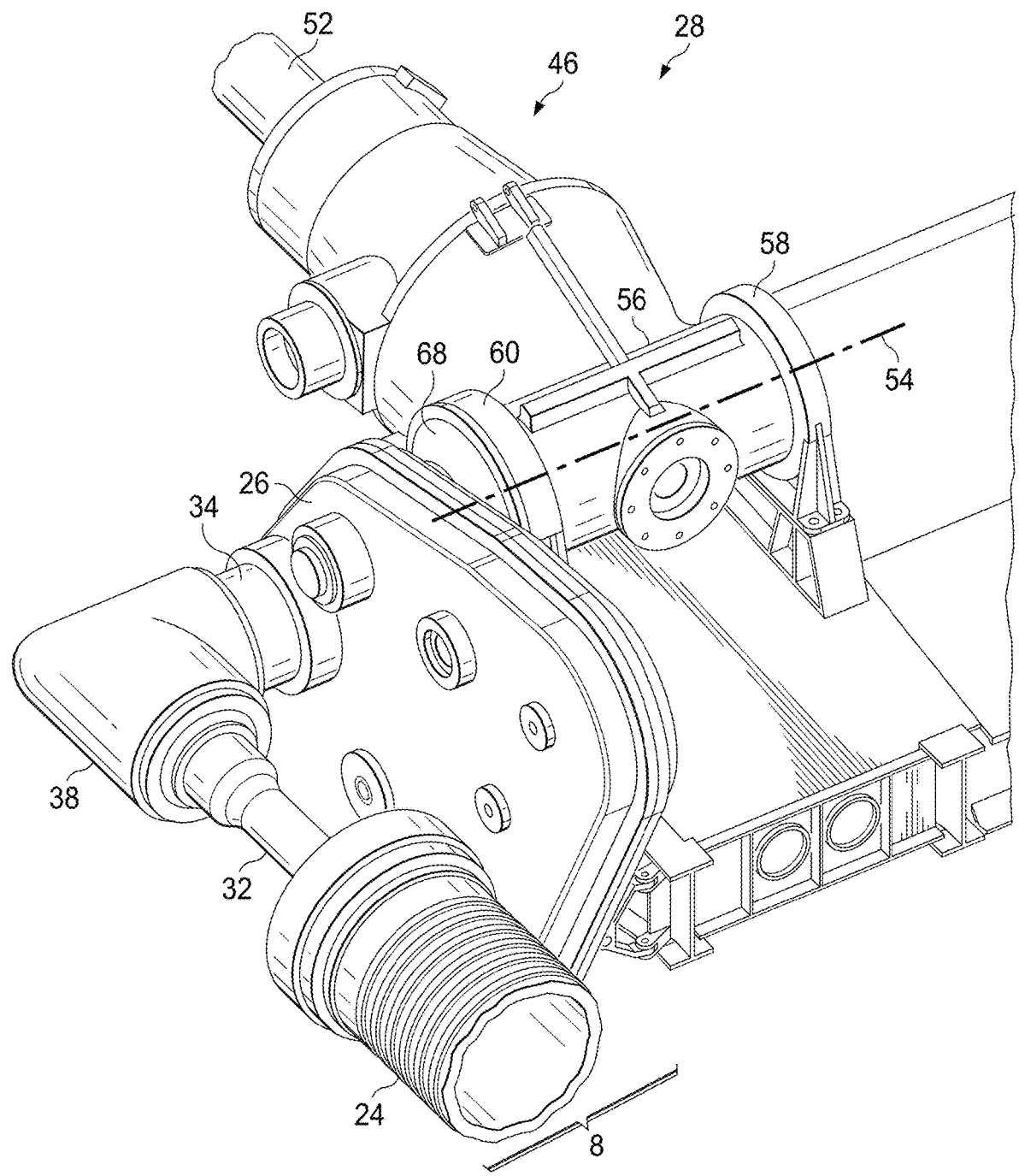
FIG. 4 illustrates a partial perspective view of an example of a propulsion system implementing a variable-speed gearbox according to one or more aspects of the disclosure.
Figure 5:
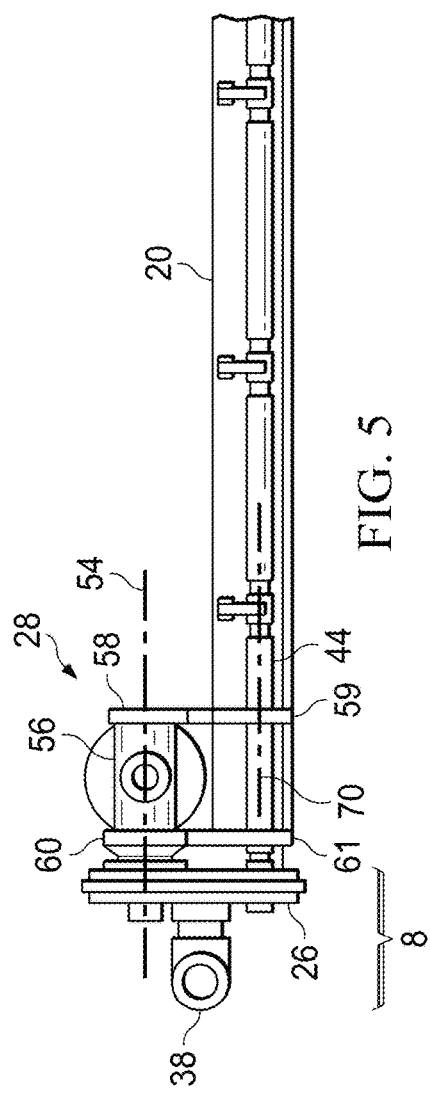
FIG. 5 illustrates a partial elevation view of a propulsion system implementing a variable-speed gearbox according to one or more aspects of the disclosure.
Figure 6:
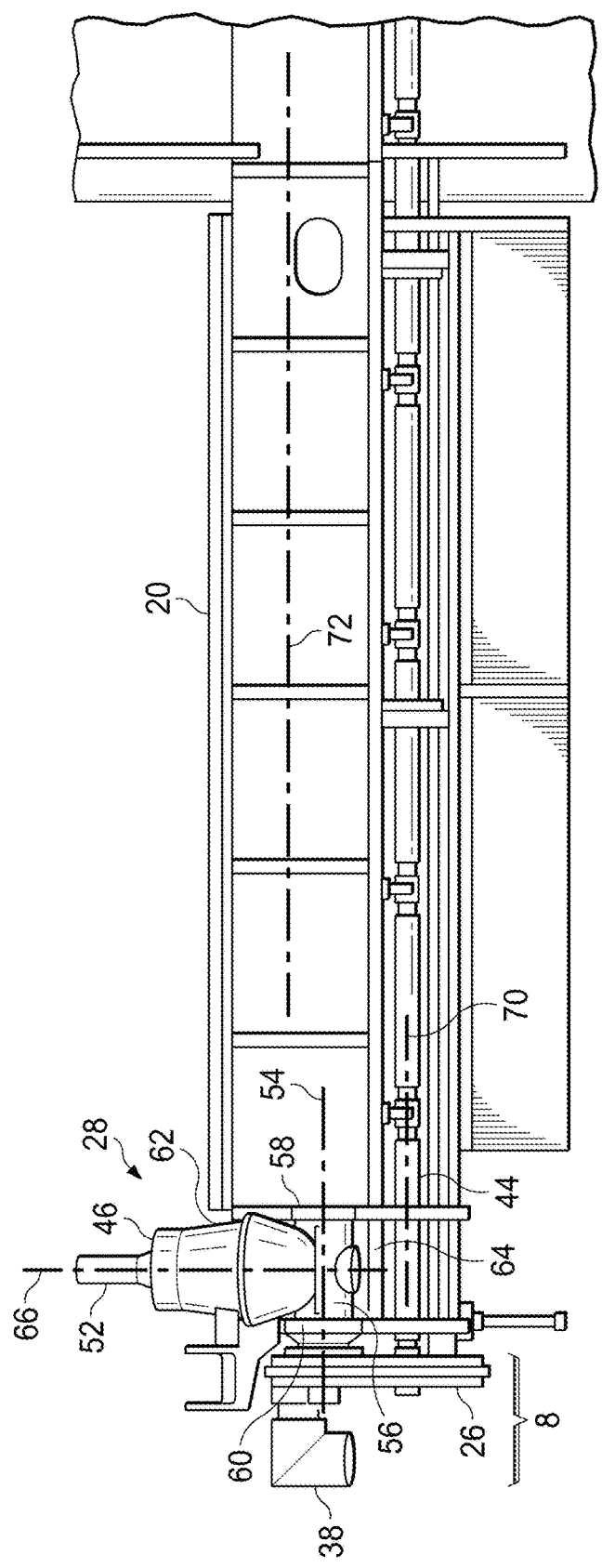
FIG. 6 illustrates a partial top view of a propulsion system implementing a variable-speed gearbox according to one or more aspects of the disclosure.

FIG. 1 illustrates a fixed-engine variable-speed tiltrotor drive system generally denoted by the numeral 10 according to one or more embodiments. FIGS. 2-3 illustrate a tiltrotor aircraft 12 that can incorporate the variable-speed tiltrotor drive system 10.

The tiltrotor aircraft 12 can include a fuselage 14, a landing gear 16, a tail member 18, a wing 20, a propulsion system 22, and a propulsion system 23. Each propulsion system 22 and 23 includes a fixed-drive system 8 which includes a fixed engine 24 and a variable-speed gearbox 26, and a rotatable drive system referred to generally as the proprotor 28. Each proprotor 28 has a plurality of rotor blades 30. The position of proprotors 28, as well as the pitch of rotor blades 30, can be selectively controlled in order to selectively control direction, thrust, and lift of tiltrotor aircraft 12. Engine 24 can be housed and supported in an engine nacelle 6. Engine nacelle 6 can include an inlet, aerodynamic fairings, and exhaust, as well as other structures and systems to support and facilitate the operation of engine 24.

FIG. 2 illustrates tiltrotor aircraft 12 in helicopter mode, in which the proprotors 28 are positioned substantially vertical to provide a lifting thrust. FIG. 3 illustrates tiltrotor aircraft 12 in an airplane mode, in which proprotors 28 are positioned substantially horizontal to provide a forward thrust in which a lifting force is supplied by wing 20. It should be appreciated that tiltrotor aircraft can be operated such that the proprotors 28 are selectively positioned between airplane mode and helicopter mode, which can be referred to as a conversion mode.

The propulsion system 22 is substantially symmetric to the propulsion system 23; therefore, for sake of efficiency certain features will be disclosed only with regard to propulsion system 22. However, one of ordinary skill in the art would fully appreciate an understanding of propulsion system 23 based upon the disclosure herein of propulsion system 22.

Further, propulsion systems 22 and 23 are illustrated in the context of tiltrotor aircraft 12; however, propulsion systems 22 and 23 can be implemented on other tiltrotor aircraft. For example, an embodiment may include a quad tiltrotor that has an additional wing member aft of wing 20; the additional wing member can have additional propulsion systems similar to propulsion systems 22 and 23. In another embodiment, propulsion systems 22 and 23 can be used with an unmanned version of tiltrotor aircraft 12. Further, propulsion systems 22 and 23 can be integrated into a variety of tiltrotor aircraft configurations.

With reference generally to FIGS. 1-11, each propulsion system 22, 23 includes a fixed-drive system 8 coupled to the proprotor 28. The fixed-drive system 8 includes an engine 24 that is fixed relative to wing 20. The fixed engine has an engine output shaft 32 that is coupled to an input shaft 34 of the variable-speed gearbox 26. An output shaft 36 of the variable-speed gearbox 26 is coupled to the proprotor 28.

The engine output shaft 32 can be coupled to the input shaft 34 of the variable-speed gearbox through a spiral bevel gearbox 38 that includes spiral bevel gears to change torque direction by 90 degrees. The variable-speed gearbox 26 includes a plurality of gears, such as helical gears, in a high-speed gear train 40 and a low-speed gear train 42 that are coupled to the output shaft 36 and an interconnect drive shaft 44. Torque is transferred from the output shaft 36 to an input of proprotor gearbox 46 of the proprotor 28. The interconnect drive shaft 44 is coupled between the propulsion system 22 and 23 gearboxes and provides a torque path that enables a single engine to provide torque to both proprotors 28 (e.g., the rotor system) in the event of a failure of the other engine. A fixed ratio between the propulsion system 22 and 23 variable-speed gearboxes 26 is maintain without regard to the shifting sequence stage to ensure that both rotors are always turning at an equivalent speed (RPM) and both proprotors are always connected with one of the engines.

In accordance to one or more embodiments the variable-speed gearbox 26 includes an accessory drive 50 coupled with one or both of the input shaft 34 and the output shaft 36 and located upstream of the proprotor 28 as further described below. One or more auxiliary devices 48 such as one or more pumps (e.g., a hydraulic pump, a coolant pump, etc.), blowers, electrical generators and the like, are coupled to and driven by the accessory drive 50. In accordance to an embodiment the accessory drive 50 is connected with the input shaft to operate off of the high input speed (engine speed) without regard to the speed of the output shaft 36 transmitted to the proprotor 28 (e.g., the proprotor gearbox 46). In an embodiment the accessory drive can be driven off of the output shaft as a failsafe, for example, if the engine of the respective propulsion system is lost.

The proprotor 28 of propulsion system 22 can include a plurality of rotor blades 30 coupled to a yoke. The yoke can be coupled to a rotor mast 52. The rotor mast 52 is coupled to the proprotor gearbox 46. It should be appreciated that proprotor 28 can include other components, such as a swashplate that is selectively actuated by a plurality of actuators to selectively control the pitch of rotor blades 30.

During operation, a conversion actuator can be actuated so as to selectively rotate proprotor gearbox 46 about a conversion axis 54 that corresponds with axis of the output shaft 36 of the fixed, variable-speed gearbox 26, which in turn selectively positions proprotor 28 between helicopter mode (shown in FIG. 2) and airplane mode (shown in FIG. 3). The operational loads, such as thrust loads, are transmitted through rotor mast 52 and into a spindle gearbox 56 of proprotor gearbox 46.

In the illustrated embodiments, the spindle gearbox 56 of proprotor gearbox 46 is mounted to an inboard pillow block 58 with an inboard bearing assembly. Similarly, spindle gearbox 56 of proprotor gearbox 46 is mounted to an outboard pillow block 60 with an outboard bearing assembly 179. Thus, spindle gearbox 56 is structurally supported but rotatable about conversion axis 54 by a conversion actuator. Inboard pillow block 58 is structurally coupled to an inboard rib 59 of the wing. Similarly, outboard pillow block 60 is structurally coupled to an outboard rib 61. It should be appreciated that the exact structural configuration is implementation specific, and that structural components can be combined and/or separated to meet implementation specific requirements.

The location of the spindle gearbox 56 portion of proprotor gearbox 46 provides an efficient structural support for enduring operational loads by being mounted to inboard rib 59 and outboard rib 61, which together with a forward wing spar 62 and an aft wing spar 64, form a structural torque box. For example, when tiltrotor aircraft 12 is in helicopter mode, torque about mast axis 66 is reacted by the torque box collectively formed by inboard rib 59, outboard rib 61, forward wing spar 62, and aft wing spar 64. It should be noted that location of spindle gearbox 56 of proprotor gearbox 46 also positions the mast axis 66, while in helicopter mode, inboard of outboard rib 61, outboard of inboard rib 59, forward of aft wing spar 64, and aft of forward wing spar 62, which allows the axis of the torque to be inside of the torque box structure, rather than cantilevered outside of the torque box structure. In contrast, a spindle gearbox location outside (such as outboard, forward, or aft) would cause a moment that would increase operational loading, thus requiring heavier and less efficient structural support.

The variable-speed gearbox 26 is secured to outboard pillow block 60 with a housing 68. Housing 68 can be a conical structure with one or more flanges configured for coupling to variable-speed gearbox 26 and outboard pillow block 60.

In the illustrated embodiment, interconnect drive shaft 44 has a rotational axis 70 that is vertically lower and horizontally aft of the conversion axis 54 of the spindle gearbox 56. Conversion axis 54 is parallel to a lengthwise axis 72 of wing 20. Location of interconnect drive shaft 44 aft of the aft wing spar provides for optimal integration with the variable-speed gearbox 26 without interfering with the primary torque transfer in the output shaft 36 between the variable-speed gearbox 26 and spindle gearbox 56; as such, the conversion axis 54 of spindle gearbox 56 is parallel to the rotational axis 70 and interconnect drive shaft 44, but located forward and above rotational axis 70.

Figure 7:
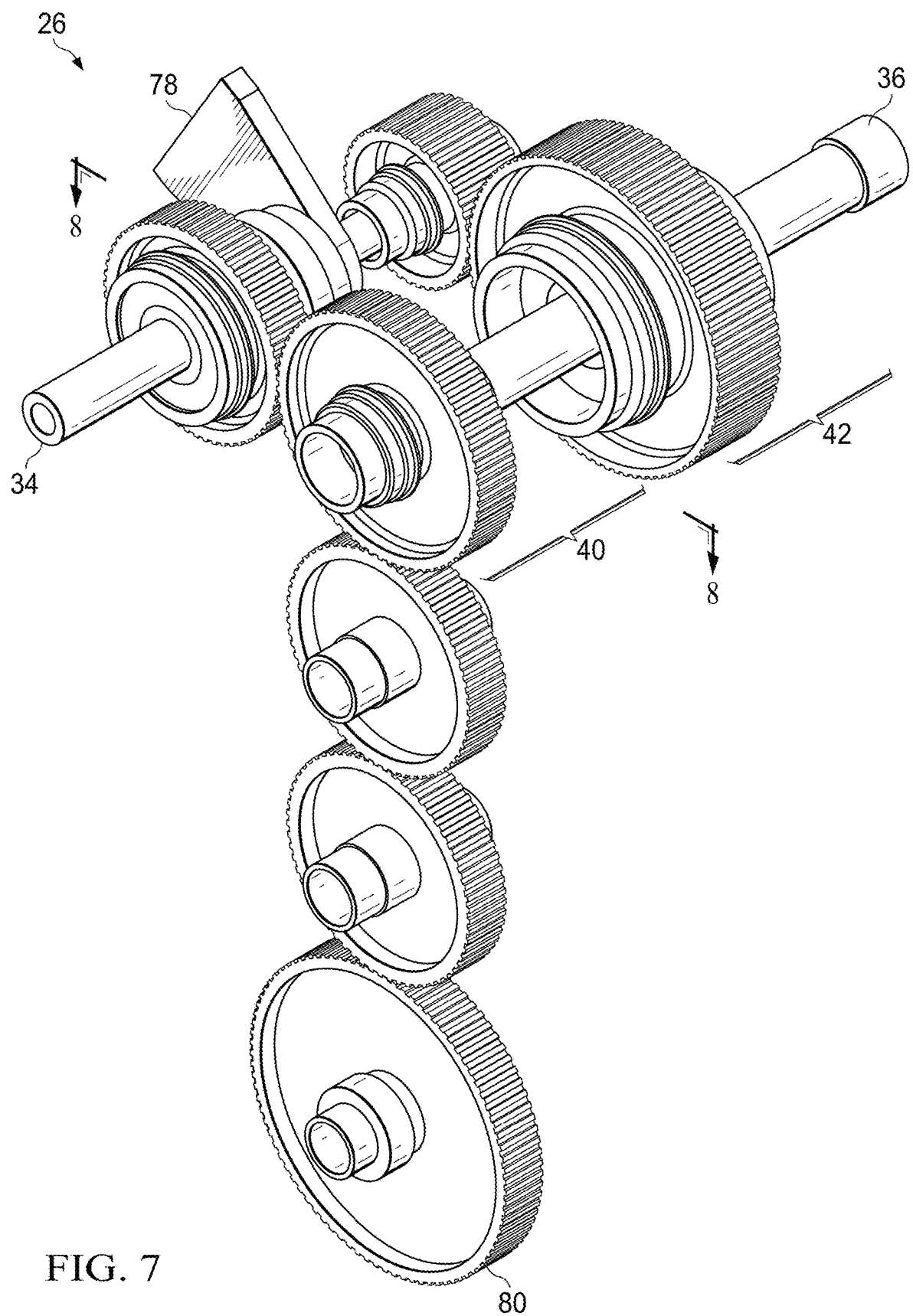
FIG. 7 illustrates a variable-speed gearbox for a fixed-engine rotatable proprotor according to one or more aspects of the disclosure.
Figure 8:
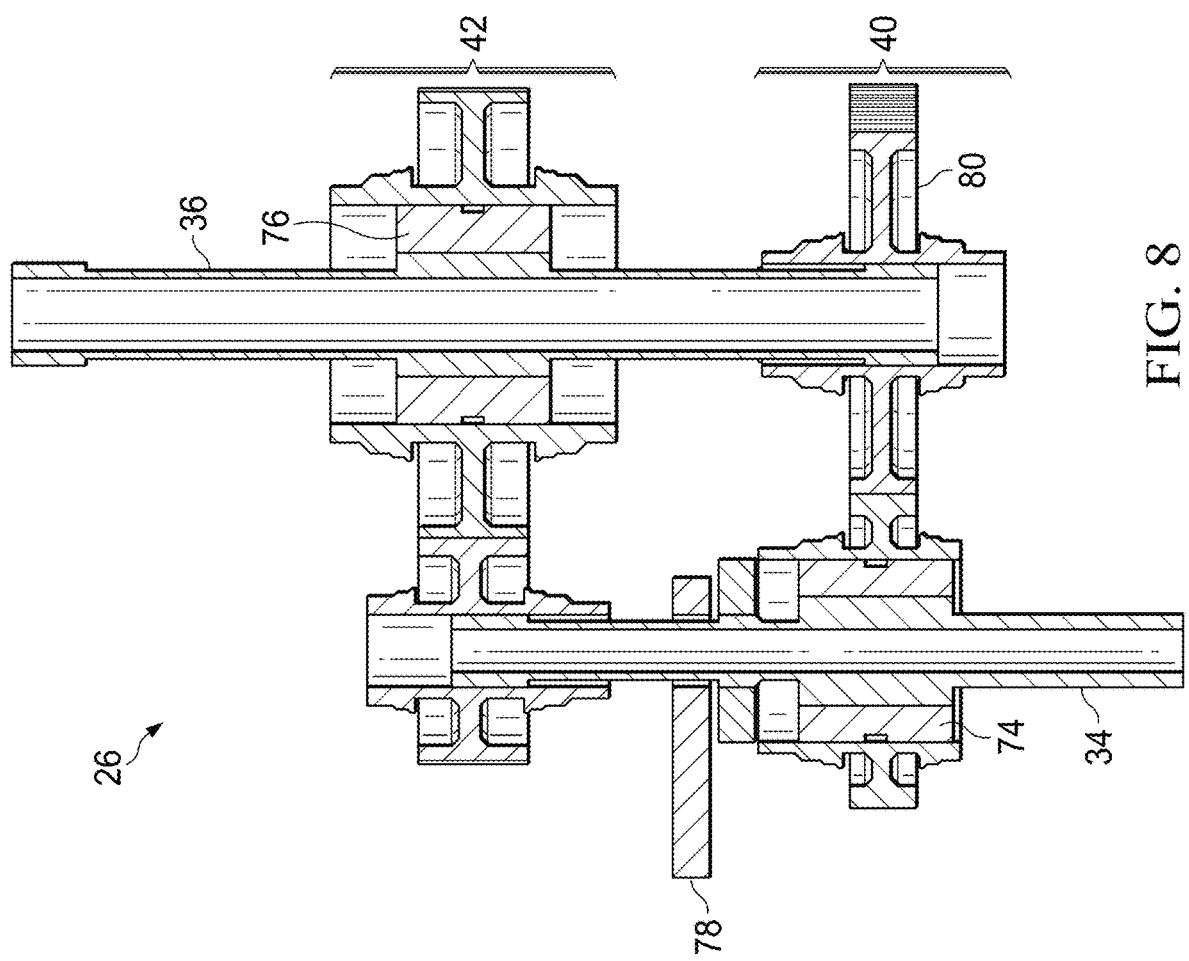
FIG. 8 is a view along the line 8-8 of FIG. 7 of a variable-speed gearbox for a fixed-engine rotatable proprotor according to one or more aspects of the disclosure.

FIGS. 7 and 8 illustrate an embodiment of a variable-speed gearbox 26 of a fixed-engine variable-speed tiltrotor drive system 10, see, e.g. FIG. 1. The illustrated variable-speed gearbox 26 includes an output shaft 36 for connecting with a proprotor, an input shaft 34 for connecting to an engine, a high-speed clutch 74 integrated into a high-speed gear train 40, and a low-speed clutch 76 integrated into a low-speed gear train 42. The high-speed gear train having an input coupled to the input shaft and output coupled to the output shaft. The low-speed gear train has an input coupled to the input shaft and output coupled to the output shaft. The high-speed gear train 40 operates for example at the speed of the engine and the low-speed gear train 42 operates at a reduced speed ratio of the engine. The high-speed clutch and the low-speed clutch are freewheeling clutches without a friction plate and are capable of disconnecting the output shaft 36 and the input shaft 34 in an overrunning condition when the output shaft spins faster than the input shaft. The variable-speed gearbox 26 shifts between the high-speed gear train and the low-speed gear train by engaging or disengaging the high-speed clutch 74 and modulating speed of the coupled engine and/or modulating the rotor speed modulation. A shifting or engagement element 78 is configured to engage and disengage the high-speed clutch 74. The variable-speed gearbox 26 includes a secondary input gear 80 that is coupled with the interconnect drive shaft 44 (FIG. 1) and the output shaft 36.

Figure 9:
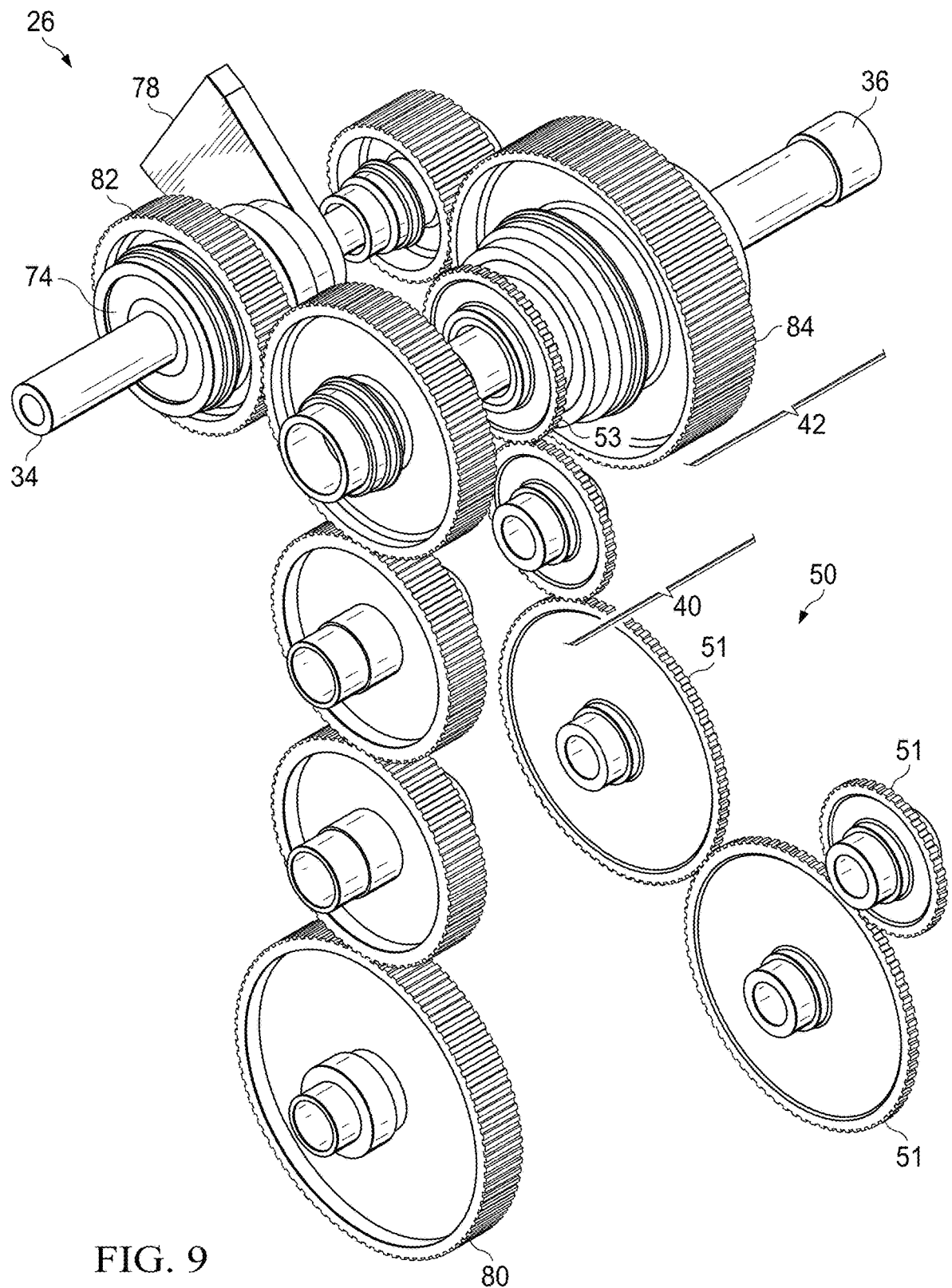
FIG. 9 illustrates a variable-speed gearbox for a fixed-engine rotatable proprotor including a fixed-ratio accessory drive according to one or more aspects of the disclosure.

FIG. 9 illustrates an embodiment of a variable-speed gearbox 26 of a fixed-engine variable-speed tiltrotor drive system 10, see, e.g. FIG. 1, incorporating an accessory drive 50. The illustrated variable-speed gearbox 26 includes an output shaft 36 for connecting with a proprotor, an input shaft 34 for connecting to an engine, a high-speed clutch 74 integrated into a high-speed gear train 40, and a low-speed clutch 76 integrated into a low-speed gear train 42. In the illustrated embodiment the high-speed gear train 40 includes a high-speed compound gear 82 and the low-speed gear train 42 has a low-speed compound gear 84. The high-speed gear train 40 operates for example at the speed of the engine and the low-speed gear train 42 operates at a reduced speed ratio of the engine. The high-speed clutch and the low-speed clutch are freewheeling clutches without a friction plate and are capable of disconnecting the output shaft 36 and the input shaft 34 in an overrunning condition when the output shaft spins faster than the input shaft. The variable-speed gearbox 26 shifts between the high-speed gear train and the low-speed gear train by engaging or disengaging the high-speed clutch 74 and modulating speed of the coupled engine and/or modulating the rotor speed modulation. A shifting or engagement element 78 is configured to engage and disengage the high-speed clutch 74. The variable-speed gearbox 26 includes a secondary input gear 80 that is coupled with the interconnect drive shaft 44 (FIG. 1) and the output shaft 36.

The variable-speed gearbox 26 illustrated in FIG. 9 includes an accessory drive (gear train) 50. In this embodiment the accessory drive 50 is a fixed-ratio drive coupled with the output shaft 36 via drive gear 53 (e.g., input) and the accessory drive matches the speed of the output shaft 36 and will therefore change to low-speed with the proprotor. One or more of the gears 51 in the accessory drive 50 may be connected to a respective accessory device 48 (FIG. 1)

Figure 10:
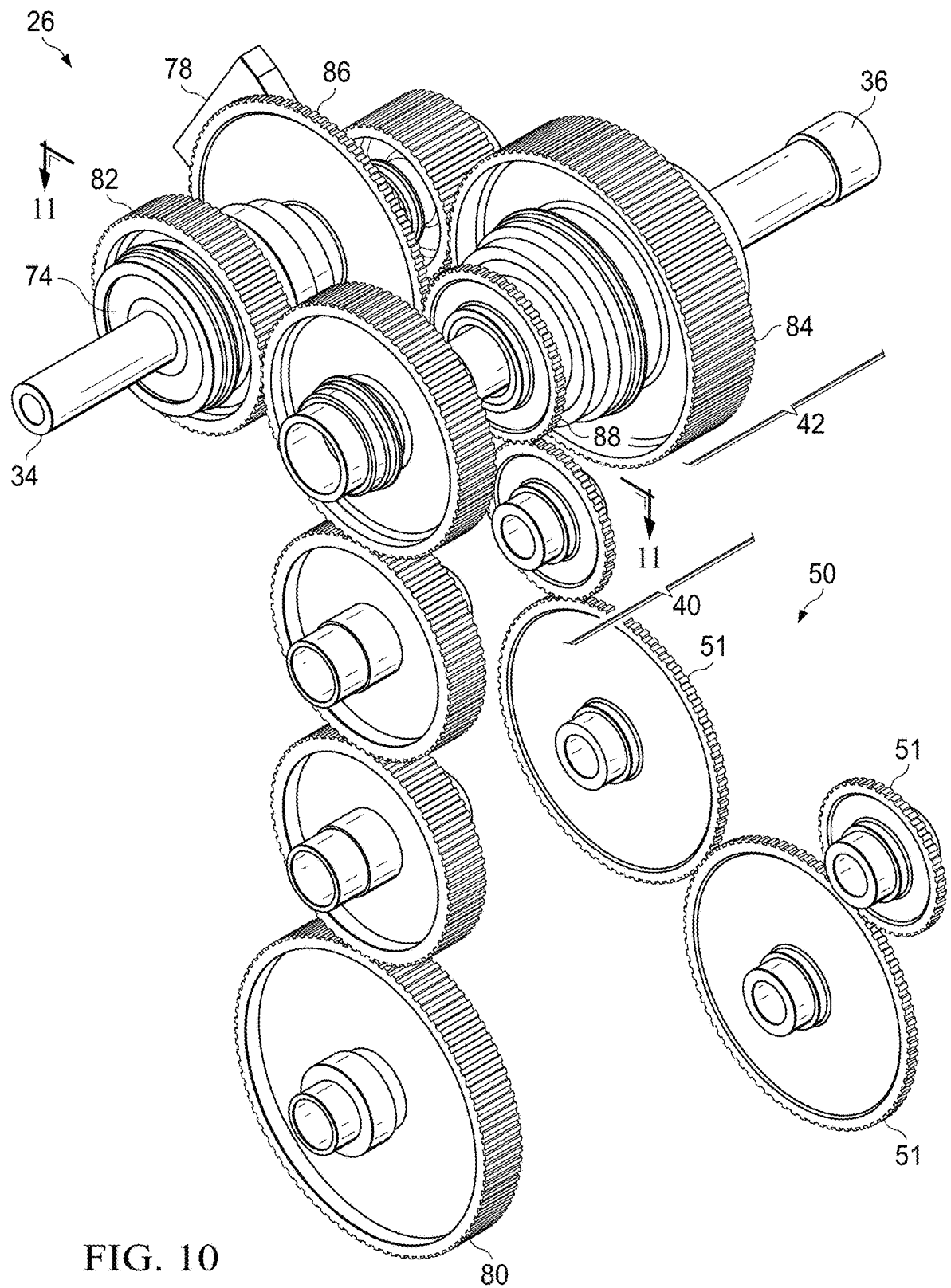
FIG. 10 illustrates a variable-speed gearbox for a fixed-engine rotatable proprotor including a variable-ratio accessory drive according to one or more aspects of the disclosure.
Figure 11:
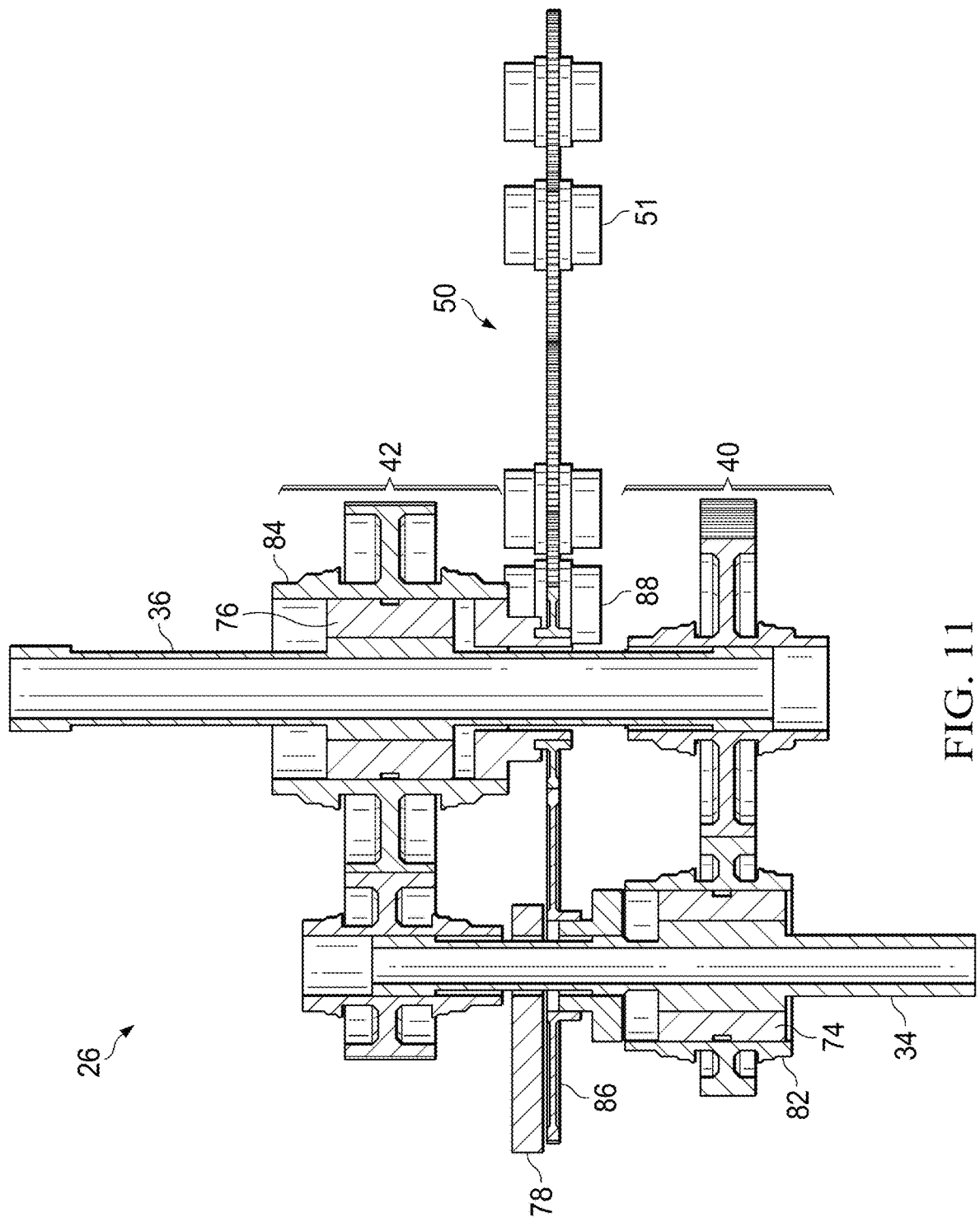
FIG. 11 is a view along the line 11-11 of FIG. 10 of a variable-speed gearbox for a fixed-engine rotatable proprotor according to one or more aspects of the disclosure.

FIGS. 10 and 11 illustrate an embodiment of a variable-speed gearbox 26 of a fixed-engine variable-speed tiltrotor drive system 10, see, e.g. FIG. 1, incorporating a variable-ratio accessory drive 50. The variable-ratio accessory drive 50 speed is matched to the engine speed, unrelated to the proprotor speed.

The illustrated variable-speed gearbox 26 includes an output shaft 36 for connecting with a proprotor, an input shaft 34 for connecting to an engine, a high-speed clutch 74 integrated into a high-speed gear train 40, and a low-speed clutch 76 integrated into a low-speed gear train 42. In the illustrated embodiment the high-speed gear train 40 includes a high-speed compound gear 82 and the low-speed gear train 42 has a low-speed compound gear 84. The high-speed gear train 40 operates for example at the speed of the engine and the low-speed gear train 42 operates at a reduced speed ratio of the engine. The high-speed clutch and the low-speed clutch are freewheeling clutches without a friction plate and are capable of disconnecting the output shaft 36 and the input shaft 34 in an overrunning condition when the output shaft spins faster than the input shaft. The variable-speed gearbox 26 shifts between the high-speed gear train and the low-speed gear train by engaging or disengaging the high-speed clutch 74 and modulating speed of the coupled engine and/or modulating the rotor speed modulation. A shifting or engagement element 78 is configured to engage and disengage the high-speed clutch 74. The variable-speed gearbox 26 includes a secondary input gear 80 that is coupled with the interconnect drive shaft 44 (FIG. 1) and the output shaft 36.

The variable-speed gearbox 26 illustrated in FIGS. 10 and 11 includes a variable-ratio accessory drive (gear train) 50. In this embodiment the variable-ratio accessory drive 50 is coupled to the input shaft 34 through a high-speed drive gear 86 and is coupled with the output shaft 36 with a freewheeling or overrunning clutch 88. The high-speed drive gear 86 matches the accessory drive 50 to the engine speed and the overrunning clutch 88 provides a failsafe so that the accessory drive operates at the output shaft 36 speed if the engine connected to the respective variable-speed gearbox 26 fails.

According to one or more embodiments, high-speed clutch 74 and low-speed clutch 76 are sprag clutches. Sprag clutches are one-way freewheeling clutches designed to transmit torque unidirectionally from the input (e.g., engine 24) to the output (e.g., proprotor 28). Due to their one-way design, sprag clutches transmit insignificant or no torque during an overrunning condition when the output shaft 36 is spinning faster than the input shaft 34. Sprag clutches prevent a rotor from driving an engine should the engine lose power. Gear shifting of high-speed clutch 74 is achieved by modulating the speed of engine 24 and engaging or disengaging high-speed clutches 74.

According to one or more embodiments, high-speed clutches 74 and low-speed clutches 76 are self-energizing clutches that do not have friction plates. A self-energizing clutch allows more efficient torque transfer as the input and output shafts mate tighter. When the speed of the input and output shafts are dissimilar in speed, the self-energizing clutch allows no torque transfer. With its internal driving mechanism, the self-energizing clutch automatically energizes and efficiently transmits torque when an overrunning condition is removed.

Conventional self-energizing clutches do not have the capability to control and modulate the speed of the output shaft with respect to the speed of the input shaft without a proper clutch mechanism. For this reason, a friction clutch may be used in series with a self-energizing freewheeling clutch to provide such capability. However, friction clutches require large friction surfaces to transmit torque from the input shaft to the output shaft, which adds more weight to the mechanism and increases maintenance requirements due to the wear and tear of engaging components. The present system and method eliminates the use of friction clutches and achieves significant advantages on efficiency, size, and weight over prior art rotorcraft drive clutch designs.

During high-speed operation, both high-speed clutch 74 and low-speed clutch 76 are engaged. However, torque is transmitted only through high-speed clutch 74 from engine 24 to proprotor 28 because low-speed clutch 76 is a one-way clutch in an overrunning condition where its output spins faster than its input.

According to an embodiment, the high-speed clutch 74 and low-speed clutch 76 are overrunning clutches. When the output shaft 36 is spinning faster than the input shaft 34 of overrunning clutches, there is no torque transmission. On the other hand, when the output shaft is not spinning faster than the input shaft of overrunning clutches, the input and output shafts are instantaneously coupled, and torque is transmitted as if the input and output shafts are coupled without differential rotation. This safety feature of overrunning clutches is especially useful in the event of engine failure so that rotors can freely rotate by automatically disconnecting the engine.

According to an embodiment, engine 24 runs at a cruising speed that is slower than the maximum speed where maximum operational efficiency of engine 24 is achieved. For example, during cruise speed operation, engines 24 and proprotors 28 run at 84% of their maximum speeds. The percentage of optimal speeds is selected for illustrative purposes only, and it is appreciated that any percentage may be used without deviating from the scope of the present subject matter.

According to an embodiment of low-speed operation, high-speed clutch 74 is disengaged, and low-speed clutch 76 transmits torque from engine 24 to proprotor 28. According to an embodiment, low-speed clutch 76 is permanently engaged for both high and low-speed operation so that gear shifting from the high gear ratio to the low gear ratio occurs by simply disengaging high-speed clutch 74. Conversely, shifting from the low gear ratio to high gear ratio occurs by re-engaging high-speed clutch 74. After shifting occurs from the high gear to the low gear, engines 24 still run at their optimal speed (e.g., 84% of their maximum speeds) while proprotors 28 spin at a low speed (e.g., 60% of its maximum speed).

For the purpose of illustration, the maximum engine speed and maximum rotor speed are symbolized as E and R.

In high gear, the maximum engine speed E generates maximum rotor speed R. The rotor speed is calculated by the following equation:

$$\Omega_{rotor} = r * \omega_{engine}$$

where r is the gear ratio. In high gear, $r_{high}$=R/E, and $r_{low}$=f*$r_{high}$, in low gear, where f is a gear reduction factor. In view of the present example, the optimum engine speed is 0.84 E (84% of the maximum engine speed) that corresponds to the rotor speed 0.84 R (84% of maximum rotor speed) when engaged in the high-speed gear.

An example for high-speed to low-speed transition is now described, with reference generally to FIGS. 1-11. In the present example, the gear reduction factor, f=0.714 is used; however it is appreciated that any other gear reduction factor might be used without deviating from the scope of the subject matter. The engine speeds of propulsion systems 22 and 23 are lowered from cruising speed (0.84 R, where "R" is the maximum rotor speed) to a slower speed, for example, 0.714R in the high-speed gear such that the proprotor spins at 0.714R. When the propulsion system 23 engine speed is reduced to just below 0.714 R, the propulsion system 23 high-speed clutch is in an overrunning condition and is easily disengaged and the propulsion system 23 gearbox is in the low gear. The propulsion system 23 torque path is switched from high-speed clutch 74 to low-speed clutch 76, although torque is not present or insignificant when the output speed of the low-speed clutch 76 is greater than its input speed. After the gear shift, the engine speed of propulsion system 23 is increased to 1.0 E to match the speed of the proprotors at 0.714 R ($r_{high}$*0.714 E).

With the propulsion system 23 engine running at full speed (1.0 E) and rotor system running at 0.714 R, similar shifting is performed on the propulsion system 22 engine and variable-speed gearbox 26 to change the torque path from high-speed clutch 74 to low-speed clutch 76. After reducing the propulsion system 22 engine speed to just below 0.714 R, the high-speed clutch is disengaged and the variable-speed gearbox 26 is in the low gear. After the gearshift, the propulsion system 22 engine speed is ramped up to 1.0 E so that both engines are driving the proprotors at a speed of 0.714 R. After the gear shifting on both systems 22 and 23 engines has occurred, the low-speed clutches solely transmit torque to the proprotors. The speeds of both engines are lowered to their cruising speed at 0.84 E such that the speed of the rotor system is lowered to the low speed.

According to an embodiment, the propulsion system 22 and 23 gearboxes switch gears sequentially such that there is at least one engine powering the proprotors at all times. As shown in the previous example of high-speed to low-speed transition, gear switching may occur in sequence, but some intermediate steps for changing the ratio between the respective engines and the rotor system may vary. For example, the engine speed of the propulsion system 22 engine may remain at 1.0 E as the propulsion system 23 gearbox shifts, or the rotor system may be freewheeling while gear shifting occurs. It is appreciated that the steps of speed adjustment and gear shifting may occur in different orders without deviating from the scope of the subject matter.

According to an embodiment, a single transmission, engine, and rotor system can change ratios by controlling the rotor speed (e.g., rotor speed modulation) using the rotor controls as opposed to another engine and interconnect system. This method permits the rotor system speed to maintain speed near the transitional speed while the engine reduces speed and the clutch overruns and disengages allowing a shift from high speed to low speed. Alternatively, to shift from a low speed to a high speed, the rotor system may be controlled to increase rotor speed taking advantage of the rotorcraft altitude and speed, and enable the transmission to shift from the low speed to the high speed in the same manner as described for the high-speed to low-speed transition.

An example for low-speed to high-speed transition according to an embodiment is now described. The same gear reduction ratio, f=0.714 is used in the present example to illustrate the speed transition from low speed to high speed. The propulsion system 22 and 23 engines run at cruising speed (0.84 E), and the rotor system spins at a low speed, 0.60 R ($r_{low}$*0.84 E) in its low gear. The speed of the respective engines is increased from the cruising speed (0.84 E) to the maximum speed (1.0 E) to ramp up the rotor speed to the shifting speed, for example, 0.714 R. The propulsion system 22 engine speed is reduced to just below 0.714 E, causing its high-speed clutch to be in an overrunning condition. The propulsion system 22 high-speed clutch is engaged in the overrunning condition, which changes the torque path from the low-speed clutch to high-speed clutch when the speed of the output shaft matches the speed of the input shaft. The propulsion system 22 engine speed is changed to 0.714 E such that torque is applied to the proprotors from the propulsion system 22 engine.

With the propulsion system 22 engine running at 0.714 E, its variable-speed gearbox 26 in high gear, and the rotor system running at 0.714 R, gear shifting is performed on the propulsion system 23 gearbox and engine. The propulsion system 23 engine speed is reduced to just below the transition speed (0.714 E) and the respective high-speed clutch 74 is engaged. After the gear shifting, the propulsion system 23 engine runs up to 0.714 E, and matches the rotor system at 0.714 R. After the shifting is completed for both gearboxes, the speed of both engines is increased to their cruising speed at 0.84 E such that speed of rotor system is increased to the cruising speed, 0.84 R.

In accordance to embodiments the fixed-engine variable-speed tiltrotor drive systems allows an operator to shift from a high-speed ratio to a low-speed ratio with minimal transient torque (slam engagement), limited to no friction clutch wear and maintains the presence of sprag clutches for over-running in one-engine inoperative (OEI) operation. The system can allow for the two gearboxes to maintain a fixed ratio between them to ensure that both rotors are always turning at an equivalent speed regardless of the shifting sequence.

The fixed-engine variable-speed tiltrotor drive system can eliminate having a heavy and wear prone friction clutch system by using engine speed modulation and a special shift sequence to either eliminate the need for a friction clutch or to use of a friction clutch only during low power transition. In accordance to some embodiments the fixed-engine variable-speed tiltrotor drive system includes a lightweight variable-speed system while maintaining a low-speed ratio failsafe, maintaining overrunning clutches for OEI, maintaining equivalent speed between rotors at all times. In accordance to some embodiments the system provides for a ratio change for the accessory gear train.

The fixed-engine variable-speed tiltrotor drive system packages the variable-speed gearbox in an area that is rotating at an intermediate speed such that the speed is not so high that clutch overrunning or speed matching with a certain percentage error is a particular challenge and not so low that high torque (such as in the planetary stage of the proprotor gearbox) drives the size of the variable-speed components to be weigh prohibitive.

An embodiment a variable-speed drive system for a tiltrotor includes a first propulsion system having a first fixed-drive system coupled to a first proprotor that is operable between a helicopter mode and an airplane mode, wherein the fixed-drive system includes a first fixed engine and a first variable-speed gearbox; a second propulsion system having a second fixed-drive system coupled to a second proprotor that is operable between a helicopter mode and an airplane mode, wherein the fixed-drive system includes a second fixed engine and a second variable-speed gearbox; and an interconnect shaft coupled between the first and second gearboxes providing a torque path that enables a single engine to provide torque to both the first and the second proprotor. The first and second variable-speed gearboxes may be configured to shift between a high gear ratio and a low gear ratio by modulating the speed of the coupled engine. The first and second variable-speed gearboxes may be configured to shift between a high gear ratio and a low gear ratio by modulating the speed of the first and second proprotors.

An embodiment a variable-speed gearbox for a tiltrotor with fixed engine and rotating proprotor includes an input shaft coupled to the respective fixed engine, an output shaft coupled to the respective proprotor; a high-speed clutch integrated into a high-speed gear train, the high-speed gear train having an input coupled to the input shaft and an output coupled to the output shaft; and a low-speed clutch integrated into a low-speed gear train, the low-speed gear train having an input coupled to the input shaft and an output coupled to the output shaft. The high-speed clutch and the low-speed clutch can be freewheeling clutches capable of disconnecting the output and the input of the respective gear train of the high and low-speed gear trains in an overrunning condition when the output rotates faster than the input of the respective gear train. The low-speed clutch can be permanently engaged. In accordance to some embodiments the variable-speed gearboxes may include an accessory drive.

In accordance to an embodiment a variable-speed drive system for a tiltrotor with fixed engine and rotating proprotor includes a first propulsion system having a first fixed-drive system coupled to a first proprotor that is operable between a helicopter mode and an airplane mode, wherein the fixed-drive system includes a first fixed engine and a first variable-speed gearbox; a second propulsion system having a second fixed-drive system coupled to a second proprotor that is operable between a helicopter mode and an airplane mode, wherein the fixed-drive system includes a second fixed engine and a second variable-speed gearbox; and an interconnect shaft coupled between the first and second gearboxes providing a torque path that enables a single engine to provide torque to both the first and the second proprotor. The variable-speed gearboxes each include an input shaft coupled to the respective fixed engine, an output shaft coupled to the respective proprotor; a high-speed clutch integrated into a high-speed gear train, the high-speed gear train having an input coupled to the input shaft and an output coupled to the output shaft; a low-speed clutch integrated into a low-speed gear train, the low-speed gear train having an input coupled to the input shaft and an output coupled to the output shaft; and an accessory drive having an input connected to one or both of the input shaft and the output shaft.

In accordance to at least one embodiment the accessory drive is a fixed-ratio drive and the input is coupled with the output shaft whereby the accessory drive matches a speed of the output shaft. In accordance to at least one embodiment the accessory drive is a variable-speed drive wherein the accessory drive matches a speed of the input shaft without regard to a speed of the output shaft. In an embodiment the accessory drive is variable-speed drive, wherein the accessory-drive input is coupled to the input shaft to match the accessory drive to an engine speed and the accessory drive is coupled to the output shaft by an overrunning clutch.

A method of operating a tiltrotor with a fixed engine and rotating proprotor includes shifting a first and a second variable-speed gearbox between a high gear ratio and a low gear ratio by one of modulating the speed of coupled first and second engines and modulating speed of first and second proprotors. The tiltrotor including a first propulsion system having a first fixed-drive system coupled to the first proprotor that is operable between a helicopter mode and an airplane mode, wherein the fixed-drive system comprises the first fixed engine and the first variable-speed gearbox; a second propulsion system comprising a second fixed-drive system coupled to the second proprotor that is operable between a helicopter mode and an airplane mode, wherein the fixed-drive system comprises the second fixed engine and the second variable-speed gearbox; an interconnect shaft coupled between the first and second gearboxes providing a torque path that enables a single engine to provide torque to both the first and the second proprotor; wherein the first and the second variable-speed gearbox each comprises an input shaft coupled to the respective fixed engine; an output shaft coupled to the respective proprotor; a high-speed clutch integrated into a high-speed gear train, the high-speed gear train having an input coupled to the input shaft and an output coupled to the output shaft; and a low-speed clutch integrated into a low-speed gear train, the low-speed gear train having an input coupled to the input shaft and an output coupled to the output shaft, wherein the high-speed clutch and the low-speed clutch are freewheeling clutches and are capable of disconnecting the output and the input of the respective gear train of the high and low-speed gear trains in an overrunning condition when the output rotates faster than the input of the respective gear train.

In accordance to an embodiment one or both of the variable-speed gearboxes includes an accessory drive having an input connected to one or both of the input shaft and the output shaft. In accordance to an embodiment one or both of the variable-speed gearboxes includes a fixed-ratio accessory drive having an input coupled with the output shaft whereby the accessory drive matches a speed of the output shaft. In accordance to an embodiment one or both of the variable-speed gearboxes includes a variable-speed accessory drive wherein the accessory drive matches a speed of the input shaft without regard to a speed of the output shaft. In accordance to an embodiment one or both of the variable-speed gearboxes includes a variable-speed accessory drive having a high-speed gear coupled to the input shaft to match the accessory drive to the first fixed-engine speed and the variable-speed accessory drive coupled to the output shaft by an overrunning clutch.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A variable-speed drive system for a tiltrotor, the variable-speed drive system comprising:
    a first propulsion system comprising a first fixed-drive system coupled to a first proprotor that is operable between a helicopter mode and an airplane mode, wherein the first fixed-drive system comprises a first fixed engine and a first variable-speed gearbox;
    a second propulsion system comprising a second fixed-drive system coupled to a second proprotor that is operable between a helicopter mode and an airplane mode, wherein the second fixed-drive system comprises a second fixed engine and a second variable-speed gearbox; and
    an interconnect shaft coupled between the first variable-speed gearbox and the second variable-speed gearbox providing a torque path that enables a single engine of the first fixed engine and the second fixed engine to provide torque to both the first proprotor and the second proprotor,
    wherein the first variable-speed gearbox and the second variable-speed gearbox each comprise:
        an input shaft coupled to the respective fixed engine;
        an output shaft coupled to the respective proprotor;
        a high-speed clutch integrated into a high-speed gear train, the high-speed gear train having an input coupled to the input shaft and an output coupled to the output shaft;
        a low-speed clutch integrated into a low-speed gear train, the low-speed gear train having an input coupled to the input shaft and an output coupled to the output shaft; and
        an accessory drive having an accessory-drive input, wherein the accessory drive is a variable-speed drive that matches a speed of the input shaft without regard to a speed of the output shaft, wherein the accessory-drive input is coupled to the input shaft through a high-speed drive gear to match the accessory drive to an engine speed, and wherein the accessory drive is coupled to the output shaft by an overrunning clutch.

2. The variable-speed drive system of claim 1, wherein the first and second variable-speed gearboxes are configured to shift between a high gear ratio and a low gear ratio by modulating a speed of a coupled fixed engine.

3. The variable-speed drive system of claim 1, wherein the first variable-speed gearbox and the second variable-speed gearbox are configured to shift between a high gear ratio and a low gear ratio by modulating a speed of the first proprotor and the second proprotor.

4. The variable-speed drive system of claim 1, wherein the high-speed clutch and the low-speed clutch are freewheeling clutches and are capable of disconnecting the output and the input of the respective gear train of the high and low-speed gear trains in an overrunning condition when the output rotates faster than the input of the respective gear train.

5. The variable-speed drive system of claim 4, wherein the first variable-speed gearbox and the second variable-speed gearbox are configured to shift between the high-speed gear train and the low-speed gear train by engaging or disengaging the high-speed clutch and modulating a speed of a coupled fixed engine.

6. The variable-speed drive system of claim 4, wherein the low-speed clutch is permanently engaged.

7. The variable-speed drive system of claim 4, wherein the low-speed clutch is permanently engaged; and
    the first variable-speed gearbox and the second variable-speed gearbox are configured to shift between the high-speed gear train and the low-speed gear train by engaging or disengaging the high-speed clutch and modulating a speed of a coupled fixed engine.

8. A tiltrotor comprising a variable-speed drive system, the variable-speed drive system comprising:
    a first propulsion system comprising a first fixed-drive system coupled to a first proprotor that is operable between a helicopter mode and an airplane mode, wherein the first fixed-drive system comprises a first fixed engine and a first variable-speed gearbox;
    a second propulsion system comprising a second fixed-drive system coupled to a second proprotor that is operable between a helicopter mode and an airplane mode, wherein the second fixed-drive system comprises a second fixed engine and a second variable-speed gearbox;
    an interconnect shaft coupled between the first variable-speed gearbox and the second variable-speed gearbox providing a torque path that enables a single engine to provide torque to both the first proprotor and the second proprotor;
    wherein the first variable-speed gearbox and the second variable-speed gearbox each comprise:
        an input shaft coupled to the respective fixed engine;
        an output shaft coupled to the respective proprotor;
        a high-speed clutch integrated into a high-speed gear train, the high-speed gear train having an input coupled to the input shaft and an output coupled to the output shaft;
        a low-speed clutch integrated into a low-speed gear train, the low-speed gear train having an input coupled to the input shaft and an output coupled to the output shaft; and
        an accessory drive having an accessory-drive input, wherein the accessory drive is a variable-speed drive that matches a speed of the input shaft without regard to a speed of the output shaft, wherein the accessory-drive input is coupled to the input shaft through a high-speed drive gear to match the accessory drive to an engine speed, and wherein the accessory drive is coupled to the output shaft by an overrunning clutch.

9. The tiltrotor of claim 8, wherein the high-speed clutch and the low-speed clutch are freewheeling clutches and are capable of disconnecting the output and the input of the respective gear train of the high and low-speed gear trains in an overrunning condition when the output rotates faster than the input of the respective gear train.

10. The tiltrotor of claim 8, wherein the low-speed clutch is permanently engaged.

11. The tiltrotor of claim 8, wherein the low-speed clutch is permanently engaged; and
    the high-speed clutch and the low-speed clutch are freewheeling clutches and are capable of disconnecting the output and the input of the respective gear train of the high and low-speed gear trains in an overrunning condition when the output rotates faster than the input of the respective gear train.

12. The tiltrotor of claim 8, wherein the low-speed clutch is permanently engaged; and the high-speed clutch and the low-speed clutch are freewheeling clutches and are capable of disconnecting the output and the input of the respective gear train of the high and low-speed gear trains in an overrunning condition when the output rotates faster than the input of the respective gear train.

13. A method of operating a tiltrotor, the method comprising:

shifting a first variable-speed gearbox and a second variable-speed gearbox between a high gear ratio and a low gear ratio by one of modulating a speed of coupled first and second engines and modulating speed of a first proprotor and a second proprotor;

wherein the tiltrotor comprises:

a first propulsion system comprising a first fixed-drive system coupled to the first proprotor that is operable between a helicopter mode and an airplane mode, wherein the first fixed-drive system comprises a first fixed engine and the first variable-speed gearbox;

a second propulsion system comprising a second fixed-drive system coupled to the second proprotor that is operable between a helicopter mode and an airplane mode, wherein the second fixed-drive system comprises a second fixed engine and the second variable-speed gearbox;

an interconnect shaft coupled between the first variable-speed gearbox and the second variable-speed gearbox providing a torque path that enables a single engine to provide torque to both the first and the second proprotor;

wherein the first variable-speed gearbox and the second variable-speed gearbox each comprise an input shaft coupled to the respective fixed engine;

an output shaft coupled to the respective proprotor;

a high-speed clutch integrated into a high-speed gear train, the high-speed gear train having an input coupled to the input shaft and an output coupled to the output shaft;

a low-speed clutch integrated into a low-speed gear train, the low-speed gear train having an input coupled to the input shaft and an output coupled to the output shaft, wherein the high-speed clutch and the low-speed clutch are freewheeling clutches and are capable of disconnecting the output and the input of the respective gear train of the high and low-speed gear trains in an overrunning condition when the output rotates faster than the input of the respective gear train; and an accessory drive having an accessory-drive input, wherein the accessory drive is a variable-speed drive that matches a speed of the input shaft without regard to a speed of the output shaft, wherein the accessory-drive input is coupled to the input shaft through a high-speed drive gear to match the accessory drive to an engine speed, and wherein the accessory drive is coupled to the output shaft by an overrunning clutch.

* * * * *